H. K. SANDELL.
MOTOR MECHANISM FOR VIOLIN PLAYERS.
APPLICATION FILED DEC. 19, 1914.
1,262,266.
Patented Apr. 9, 1918.
2 SHEETS—SHEET 1.
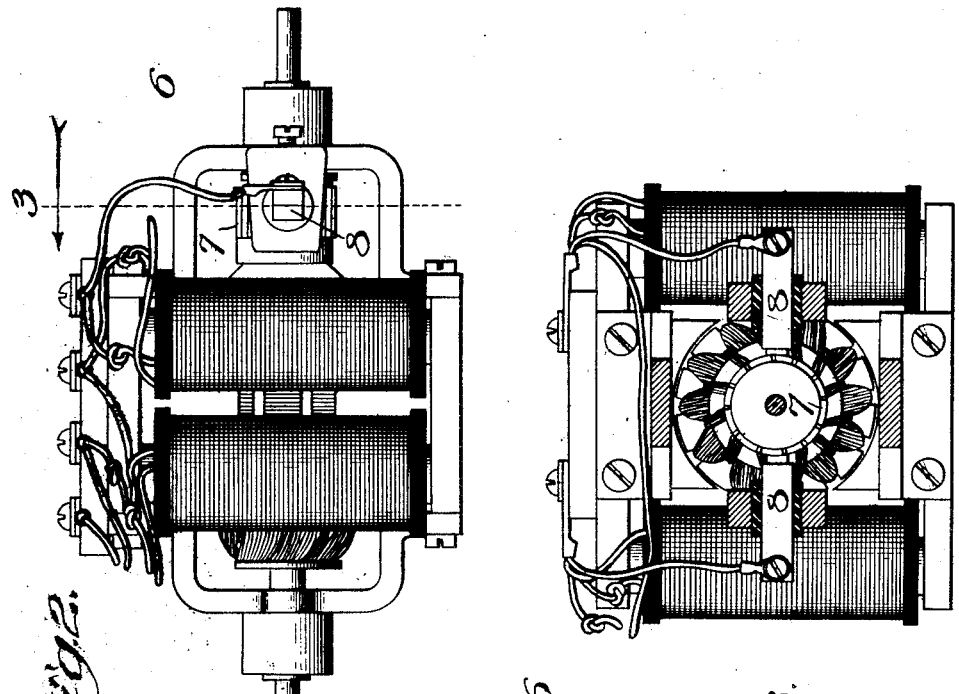
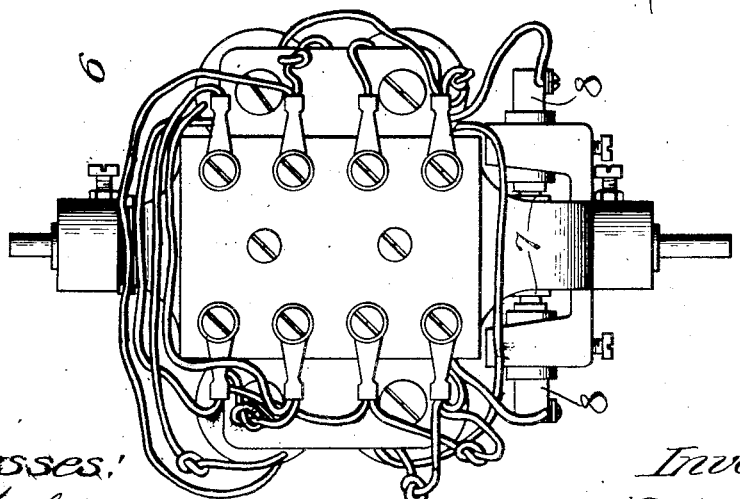

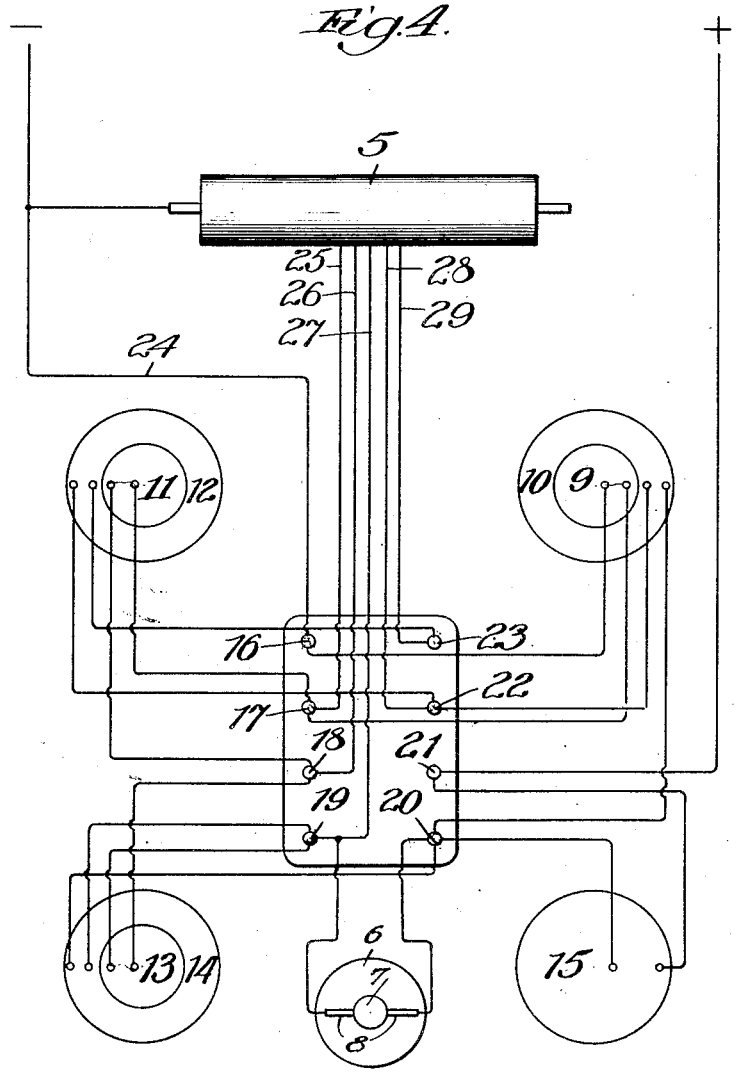
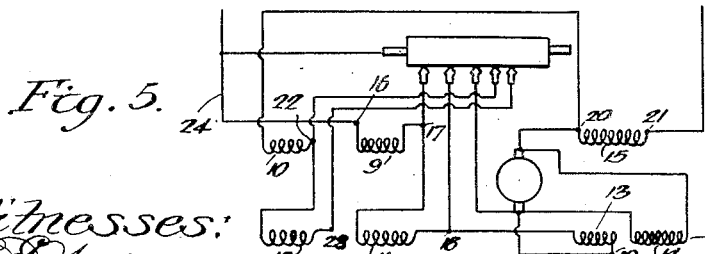

UNITED STATES PATENT OFFICE.

HENRY K. SANDELL, OF CHICAGO, ILLINOIS, ASSIGNOR TO MILLS NOVELTY COMPANY, OF CHICAGO, ILLINOIS, A CORPORATION OF ILLINOIS.

MOTOR MECHANISM FOR VIOLIN-PLAYERS.

1,262,266.  Specification of Letters Patent.  Patented Apr. 9, 1918.

Application filed December 19, 1914. Serial No. 878,068.

*To all whom it may concern:*

Be it known that I, HENRY K. SANDELL, a citizen of the United States, residing at Chicago, in the county of Cook and State of Illinois, have invented a new and useful Improvement in Motor Mechanism for Violin-Players, of which the following is a specification.

My invention relates to certain new and useful improvements in motor mechanism for violin players and is fully described and explained in the specification and shown in the accompanying drawings, in which:—

Figure 1 is a top plan of my improved motor; Fig. 2 is a side elevation looking from the left of Fig. 1; Fig. 3 is a section on the line 3 of Fig. 2; Fig. 4 is a diagrammatic view of the circuit, and Fig. 5 is another diagrammatic view of the circuit.

Referring to the drawings, 5 is a roller of conducting material. For practical use in the violin player, the paper note-sheet passes over this roller and the perforations therein enable any one of a series of brushes to make electrical contact with the roll. Such brushes are diagrammatically shown in Fig. 4, and their operation will be hereinafter explained in detail. 6 is the armature of the motor, the same being provided with a commutator 7 upon which bear brushes 8. The fields are energized by four magnets at the corners. Each has a central iron core and is provided with several windings as will now be set forth. One magnet has two coils 9 and 10, the next, two coils 11 and 12, the next, two coils 13 and 14, and the fourth magnet a single coil 15, the winding of the coil 12 being preferably of lower resistance per term than the winding of the coil 10. In the motors which I construct, I find it convenient to make the coils 9, 10, 11, 12 and 13 of 125 ohms resistance, the coil 14 of 600 ohms resistance, the coil 15 of 160 ohms resistance, and the armature of 150 ohms resistance. Of course, these figures can be widely varied but from a consideration of them the proportions which the several coils bear to each other and the resultant electrical effects thereby produced can be more readily understood. The top of the motor bears an insulating block upon which are eight electrical terminals numbered 16 to 23, inclusive. The terminal 16 is connected by a wire 24 to one pole of the source of current, the metallic roll 5 being connected to the same pole. The terminal 16 is also connected to one end of the coil 9 of one magnet, the opposite end being connected to the terminal 17. The terminals 17 and 18 are connected to opposite ends of the inner coil 11 of the next magnet. The terminals 18 and 19 are respectively connected to opposite ends of the inner coil 13 of the next succeeding magnet. The terminals 19 and 20 are connected to the two brushes and also to the two terminals of the field-magnet coil 14, which is, therefore, in parallel with the armature at all times. The terminals 20 and 21 are connected to opposite ends of the field coil 15, the terminal 21 also being connected to the opposite pole of the source of current.

So far I have described the connections of the coils 9, 11, 13, 14, 15 and the armature 6, and it is now possible to explain the manner in which four of the speeds of the motor are obtained. Under normal conditions all of the brushes will be held off of the metallic roll 5 by the note-sheet which will intervene and the motor will run at what I will hereafter term normal speed. The circuit will be as follows:—

From one pole of the source of current to the terminal 16, thence through the coil 9 to the terminal 17, thence through the coil 11 to the terminal 18, thence through the coil 13 to the terminal 19, thence through the armature and the parallel field coil 14 to the terminal 20, thence through the coil 15 to the terminal 21, and so to the opposite pole of the source of current. A higher speed is produced when the brush which is designated 25 is in contact with the metallic roll. The current passes then from one pole of the source of current, through the metallic roll and the brush 25 direct to the terminal 17, the circuit being therefore just as before, excepting that the coil 9 is omitted from the circuit. The fields are thus weaker and the speed higher. If the next succeeding brush 26 be in contact with the roll 5, the current passes directly from one source of current through the roll to the terminal 18, the coils 9 and 11 both being omitted from the circuit originally traced. If the third brush 27 be the one in contact with the roll 5, the current passes direct to the terminal 19, so that the coils 9, 11 and 13 are all omitted, the remainder of the circuit being as heretofore set forth. Manifestly, these arrangements give three speeds higher than the so-called normal speed.

The coils 10 and 12 are operative in giving lower speeds than the normal. The coil 10 is connected to the terminals 20 and 22 and the coil 12 is connected to the terminals 22 and 23, to which are connected two other brushes 28 and 29, respectively.

If the brush 28 bears on the roll 5, in the absence of any other brush, the motor will be running at and receiving current as under normal condition. In addition, a separate circuit will be set up through the brush 28, terminal 22, coil 10 to the terminal 20, thence through the coil 15 to the terminal 21 and so to the other pole of the source of current. The coil 10 will thus be energized and the coil 15 will receive considerable additional current, the field being thus greatly strengthened. If the brush 29, on the other hand, bears on the roll 5, an additional current will pass in through the terminal 23 and coil 12 to the terminal 22, whence it will flow in the course just traced. This will produce a still further strengthening of the fields and consequent still slower speed.

While, of course, it might be possible to use certain of the brushes simultaneously and so get additional permutations, for most purposes the six speeds thus described will be sufficient, and I find, in practice, that by the arrangement set forth the widest possible variations of speed can be obtained so that the violin-playing bow, which is driven by this motor, produces all the shades of expression which may be desired.

I realize that considerable variation is possible in the details of construction herein shown, and I do not intend to limit myself thereto, except as pointed out in the following claims, in which it is my intention to claim all the novelty inherent in the device as broadly as is permitted by the state of the art.

What I claim as new and desire to secure by Letters Patent is:—

1. In a motor mechanism for violin players and the like and in combination, a motor having in its field a plurality of magnetic bodies surrounded by exciting coils, certain of which are adapted to be connected in series and others of which are adapted to be connected in shunt, connections for leading current through certain of said series coils to drive the motor at normal speed, a contact roll over which a perforated music sheet is adapted to be passed and arranged to be connected with one pole of a source of current, a series of brushes adapted to bear on the contact roll through openings in the music sheet and having connections, respectively, with different points in the series field circuit between the coils thereof to short circuit certain of the coils when in electrical contact with the contact roll, and other brushes adapted to bear on the contact roll and having connection with said shunt coils whereby the shunt coils may be controlled to vary the speed of the motor.

2. In a motor mechanism for violin players and the like and in combination, a motor having four magnetic bodies in its field, three of which are surrounded by two windings, and one of which is surrounded by one winding only, means normally to lead current in series through one of the two windings of the three coils having double windings, through the armature and through the single wound field-coil, the second coil of one of the magnetic bodies being connected in parallel with the armature, a contact roll over which a perforated music sheet is adapted to be passed and having connection with one pole of the source of current, three brushes adapted to contact therewith through the openings in the music sheet for short circuiting the series coils of the three magnets, whereby to give three speeds higher than the normal speed.

3. In a motor mechanism for violin players and the like and in combination, a motor having four magnetic bodies in its field, three of which are surrounded by two windings, and one of which is surrounded by one winding only, means normally to lead current in series through one of the two windings of the three coils having double windings, through the armature and through the single wound field-coil, the second coil of one of the magnetic bodies being connected in parallel with the armature, a contact roll over which a perforated music sheet is adapted to be passed and having connection with one pole of the source of current, three brushes adapted to contact therewith through the openings in the music sheet for short-circuiting the series coils of the three magnets, whereby to give three speeds higher than the normal speed, and two other brushes adapted respectively to lead current through one and both of the remaining coils of the double-wound magnets, giving lower speeds than the normal speed.

In testimony whereof I have hereunto set my hand this 7th day of December, 1914.

HENRY K. SANDELL.

In presence of two subscribing witnesses:
NELLIE B. DEARBORN,
A. C. FISCHER.